United States Patent
Han

(10) Patent No.: US 11,681,410 B2
(45) Date of Patent: Jun. 20, 2023

(54) ICON MANAGEMENT METHOD AND TERMINAL DEVICE

(71) Applicant: VIVO MOBILE COMMUNICATION CO., LTD., Guangdong (CN)

(72) Inventor: Shuai Han, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 6 days.

(21) Appl. No.: 17/537,340

(22) Filed: Nov. 29, 2021

(65) Prior Publication Data

US 2022/0083205 A1 Mar. 17, 2022

Related U.S. Application Data

(63) Continuation of application No. PCT/CN2020/086114, filed on Apr. 22, 2020.

(30) Foreign Application Priority Data

May 31, 2019 (CN) .......................... 201910468230.3

(51) Int. Cl.
| | | |
|---|---|---|
| G06F 3/04817 | (2022.01) | |
| G06F 3/0483 | (2013.01) | |
| G06F 3/04842 | (2022.01) | |
| G06F 3/04845 | (2022.01) | |

(52) U.S. Cl.
CPC ........ *G06F 3/04817* (2013.01); *G06F 3/0483* (2013.01); *G06F 3/04842* (2013.01); *G06F 3/04845* (2013.01)

(58) Field of Classification Search
CPC .............. G06F 3/04817; G06F 3/0483; G06F 3/04842; G06F 3/04845; G06F 3/04847; G06F 3/0488
See application file for complete search history.

(56) References Cited

U.S. PATENT DOCUMENTS

| | | | |
|---|---|---|---|
| 2007/0106950 A1* | 5/2007 | Hutchinson | H04L 12/1831 715/761 |
| 2009/0058821 A1* | 3/2009 | Chaudhri | G06F 3/0488 345/173 |
| 2012/0062549 A1* | 3/2012 | Woo | G06F 3/04817 345/173 |

(Continued)

FOREIGN PATENT DOCUMENTS

| | | |
|---|---|---|
| CN | 102819574 A | 12/2012 |
| CN | 103186336 A | 7/2013 |

(Continued)

OTHER PUBLICATIONS

International Search Report of International Application No. PCT/CN2020/086114 dated Jul. 20, 2020.

(Continued)

*Primary Examiner* — Kieu D Vu
*Assistant Examiner* — Alvaro R Calderon, IV
(74) *Attorney, Agent, or Firm* — IP & T Group LLP

(57) ABSTRACT

An icon management method includes: activating a first page in a case that a first preset input is received; receiving a second preset input performed on a target icon in the first page; and displaying the target icon in a second page in response to the second preset input. The second page is different from the first page.

11 Claims, 8 Drawing Sheets

Page A

Page B

(56) References Cited

U.S. PATENT DOCUMENTS

| | | | | |
|---|---|---|---|---|
| 2012/0084692 A1* | 4/2012 | Bae | G06F 3/0486 | 715/769 |
| 2012/0166987 A1* | 6/2012 | Kang | G06F 3/0483 | 715/765 |
| 2012/0260213 A1* | 10/2012 | Yang | G06F 3/0483 | 715/810 |
| 2012/0304084 A1* | 11/2012 | Kim | G06F 3/0488 | 715/762 |
| 2013/0117698 A1* | 5/2013 | Park | G06F 3/04883 | 715/765 |
| 2013/0145287 A1* | 6/2013 | Jung | G06Q 10/10 | 715/753 |
| 2013/0311920 A1* | 11/2013 | Koo | G06F 3/04883 | 715/765 |
| 2014/0013254 A1* | 1/2014 | Hosein | G06F 3/04883 | 715/765 |
| 2014/0101583 A1* | 4/2014 | Jeong | G06F 9/451 | 715/765 |
| 2014/0123081 A1* | 5/2014 | Park | G06F 21/36 | 715/863 |
| 2014/0164966 A1* | 6/2014 | Kim | G06F 3/0486 | 715/769 |
| 2014/0165006 A1* | 6/2014 | Chaudhri | H04N 7/15 | 715/835 |
| 2014/0283142 A1* | 9/2014 | Shepherd | G06F 3/0488 | 726/30 |
| 2015/0015500 A1* | 1/2015 | Lee | G06F 3/04886 | 345/173 |
| 2015/0077333 A1* | 3/2015 | Dong | G06F 3/04845 | 345/156 |
| 2015/0089410 A1* | 3/2015 | Liu | G06F 3/04817 | 715/765 |
| 2015/0169183 A1* | 6/2015 | Son | G06F 3/0482 | 715/765 |
| 2015/0242076 A1* | 8/2015 | Jo | G06F 3/0482 | 715/765 |
| 2015/0277692 A1* | 10/2015 | Liu | G06F 3/04817 | 715/835 |
| 2015/0355823 A1* | 12/2015 | Han | G06F 3/04817 | 715/765 |
| 2016/0034130 A1* | 2/2016 | Li | G06F 3/0483 | 715/769 |
| 2016/0048284 A1* | 2/2016 | Kim | G06F 3/04817 | 715/770 |
| 2016/0071241 A1* | 3/2016 | Karunamuni | G06F 3/04886 | 345/156 |
| 2016/0147362 A1* | 5/2016 | Eim | G06F 3/0416 | 345/173 |
| 2016/0162157 A1* | 6/2016 | Liang | G06F 3/0482 | 715/765 |
| 2016/0188166 A1* | 6/2016 | Wang | G06F 3/0482 | 715/745 |
| 2016/0188546 A1* | 6/2016 | Gavriel | G06F 3/04847 | 715/760 |
| 2016/0224198 A1* | 8/2016 | Yoon | G06F 3/0485 | |
| 2016/0253059 A1* | 9/2016 | Choi | G06F 3/0483 | 715/776 |
| 2016/0342305 A1 | 11/2016 | Jin et al. | | |
| 2017/0038946 A1* | 2/2017 | Deng | G06F 3/0488 | |
| 2017/0277400 A1* | 9/2017 | Lee | G06F 3/04817 | |
| 2017/0315702 A1* | 11/2017 | Tsao | H04L 67/141 | |
| 2018/0032243 A1* | 2/2018 | Lu | G06F 3/0486 | |
| 2018/0164963 A1* | 6/2018 | Ku | G06F 3/04883 | |
| 2018/0196589 A1* | 7/2018 | Feit | G06F 3/04847 | |
| 2018/0321825 A1 | 11/2018 | Martineli | | |
| 2019/0042066 A1* | 2/2019 | Kim | G06F 1/1649 | |
| 2019/0073099 A1* | 3/2019 | Liu | G06F 3/04883 | |
| 2019/0179500 A1* | 6/2019 | Kim | G06F 3/0481 | |
| 2020/0081592 A1* | 3/2020 | Lin | G06F 3/0485 | |
| 2020/0142548 A1* | 5/2020 | Karunamuni | G06F 3/04842 | |
| 2020/0192552 A1* | 6/2020 | Taki | G06F 3/0482 | |
| 2020/0233568 A1* | 7/2020 | Wang | G06F 3/04845 | |
| 2020/0241732 A1* | 7/2020 | Lu | G06F 3/04886 | |
| 2020/0333944 A1* | 10/2020 | Guo | G06F 3/0486 | |
| 2022/0057932 A1* | 2/2022 | Kim | G06F 3/04886 | |

FOREIGN PATENT DOCUMENTS

| | | |
|---|---|---|
| CN | 103324404 A | 9/2013 |
| CN | 104808911 A | 7/2015 |
| CN | 105718149 A | 6/2016 |
| CN | 105739887 A | 7/2016 |
| CN | 106527869 A | 3/2017 |
| CN | 106775247 A | 5/2017 |
| CN | 106843641 A | 6/2017 |
| CN | 107193438 A | 9/2017 |
| CN | 108255402 A | 7/2018 |
| CN | 108287643 A | 7/2018 |
| CN | 109460175 A | 3/2019 |
| CN | 110221741 A | 9/2019 |

OTHER PUBLICATIONS

Written Opinion of The International Searching Authority of International Application No. PCT/CN2020/086114 dated Jul. 20, 2020.
First Office Action of Priority Application No. 201910468230.3 dated Jun. 28, 2020.

* cited by examiner

US 11,681,410 B2

ICON MANAGEMENT METHOD AND TERMINAL DEVICE

CROSS-REFERENCE OF RELATED APPLICATIONS

This application is a Bypass Continuation Application of PCT/CN2020/086114, filed on Apr. 22, 2020, which claims priority to Chinese Patent Application No. 201910468230.3 filed on May 31, 2019, which are incorporated herein by reference in their entirety.

TECHNICAL FIELD

The present disclosure relates to the field of communication technologies, and in particular, to an icon management method and a terminal device.

BACKGROUND

With the continuous emergence of various application programs and the rapid development of terminal technologies, more and more application programs can be installed on terminal devices such as mobile phones, and correspondingly, users use various application programs and terminal devices more frequently. When more and more application programs are installed on terminal devices, users often need to perform page management on application icons of various application programs or application folder icons that have been classified, for example, display an application icon of a first page in a second page, or display an application folder icon of a second page in a third page.

SUMMARY

The embodiments of the present disclosure provide an icon management method and a terminal device.

According to a first aspect, an embodiment of the present disclosure provides an icon management method, applied to a terminal device. The method includes:

activating a first page in a case that a first preset input is received;

receiving a second preset input performed on a target icon in the first page; and displaying the target icon in a second page in response to the second preset input, where the second page is different from the first page.

According to a second aspect, an embodiment of the present disclosure provides a terminal device, including:

an activation module, configured to activate a first page in a case that a first preset input is received;

a first receiving module, configured to receive a second preset input performed on a target icon in the first page; and a responding module, configured to display the target icon in a second page in response to the second preset input, where the second page is different from the first page.

According to a third aspect, an embodiment of the present disclosure provides a terminal device, including a processor, a memory, and a computer program stored in the memory and executable on the processor. The computer program, when executed by the processor, implements the steps of the foregoing icon management method.

According to a fourth aspect, an embodiment of the present disclosure further provides a non-transitory computer-readable storage medium, storing a computer program, where the computer program, when executed by a processor, implements steps of the foregoing icon management method.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

In related technologies, for example, in a process of moving an icon, an operation of managing an icon between different pages is usually that a user long presses icons on the desktop to make the icons enter an editable state, selects a target icon, and then drags the target icon to a desired page. As can be seen, this icon management method requires the user to drag the icon to move a long distance across pages, and it is inconvenient for the user to quickly complete the icon movement operation. The user often fails to move the icon during the cross-page dragging process, and consequently the user often needs to perform multiple repeated operations to move the icon to the desired page.

It can be seen that the icon management method in related technologies has the problem of inconvenient user operation and low efficiency.

Figure 1:
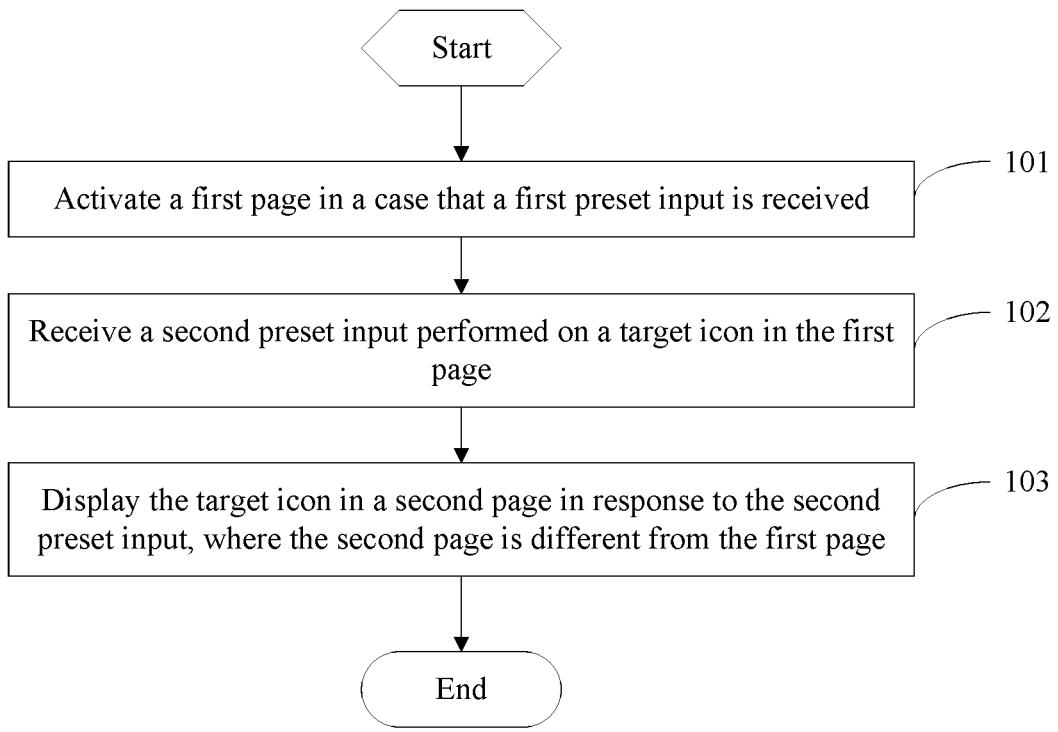
FIG. 1 is a flowchart of an icon management method according to the embodiments of the present disclosure.

Referring to FIG. 1, FIG. 1 is a flowchart of an icon management method according to the embodiments of the present disclosure. The method is applied to a terminal device. As shown in FIG. 1, the method includes the following steps:

Step 101: Activate a first page in a case that a first preset input is received.

The first preset input may be a preset input for activating the first page or an input on the first page for instructing to activate the page, for example, an input of touching a page activation control, an input of long pressing the first page, a preset sliding input on the first page, or other preset touch inputs. It should be noted that the first preset input may also be the same input as an input that triggers the icon in the page to enter an editable state. For example, the first preset input may be a long-press input performed on any icon in the first page, and this input can trigger the icon in the page to enter the editable state.

The first page may be a page where an icon to be managed is stored, and may be determined according to an operation object of the first preset input. For example, if the first preset input is a specific input performed on a page, it may be directly determined that the page is the first page, or the first page may be determined based on an event associated with the first preset input, for example, it is preset that the event associated with the first preset input is activating the first page.

The activating the first page may be activating an icon in the first page, so that the icon enters the editable state, to perform page management on the target icon in the first page. Optionally, the activating the first page may include: displaying a specific control on each icon in the first page such as a movement control, a copy control, or a replacement control, so that the user only needs to touch a specific control on the target icon to quickly complete a management operation performed on the icon.

Step 102: Receive a second preset input performed on a target icon in the first page.

The target icon may be any icon in the first page, that is, the user may perform the second preset input on any one of icons displayed in the first page. The second preset input may be a preset input for triggering the target icon to be displayed in the second page. Optionally, the second preset input may be a specific input performed on the target icon, or a touch input performed on a specific control (such as a movement control) on the target icon.

In this way, when a user wants to manage the target icon in the first page, the user may perform the second preset input on the target icon.

Optionally, step 101 includes:
displaying a first target control on each icon in the first page in a case that the first preset input is received.

Step 102 includes:
receiving the second preset input performed on the first target control on the target icon in the first page.

The icon may be any icon on the desktop of the terminal device, and may be any application icon or application folder icon.

The first preset input may be a long-press operation performed on any icon in the first page. This operation can trigger an icon on the desktop to enter an editable state, and can also trigger the first target control to be displayed on each icon in the first page.

In this embodiment, the activating the first page may be displaying the first target control on each icon in the first page. The first target control may be a control for triggering icon movement, copying, or replacement, and may be displayed at any position of the icon or at a preset position next to the icon. To keep the interface beautiful and facilitate user operation, the first target control may be displayed on the icon in the form of a corner mark, for example, displayed at the lower left corner, the lower right corner, or the upper left corner of the icon.

The second preset input may be a touch input such as tap, double tap, long press, or press. In this implementation, when a user wants to control the target icon in the first page to be displayed in the second page, the user may perform the second preset input on the first target control on the target icon.

In this way, the first target control is displayed on each icon of the first page, so that the user can easily and quickly complete management of moving, copying, or replacing the target icon in the first page.

Optionally, the first target control on the target icon displays at least one recommended page option corresponding to the target icon; and the receiving the second preset input performed on the first target control on the target icon in the first page includes:

receiving the second preset input performed on a target recommended page option, where the target recommended page option is one of the at least one recommended page option, and a page indicated by the target recommended page option is the second page.

In this implementation, to allow the user to flexibly select a target display page of the target icon and quickly complete a function of managing the target icon through the first target control, at least one recommended page option corresponding to the target icon may be displayed in the first target control on the target icon, or even at least one recommended page option corresponding to each icon in the first page is displayed in the first target control on the icon. Therefore, the user may directly select a desired recommended page from the at least one recommended page option displayed in the first target control on the target icon, that is, the user only needs to perform the second preset input on the target recommended page displayed in the first target control on the target icon, to trigger the terminal device to display the target icon in the second page indicated by the target page recommendation option.

The recommended page option may be recommended and determined by the terminal device according to a preset rule. For example, the recommended page option displayed in the first target control on each icon may include other page options except a page where the icon is currently located, or include one or more page options that match the target icon to a higher extent and are determined based on relevant attribute information of the target icon.

In this way, the at least one recommended page option corresponding to the target icon is displayed in the first target control on the target icon, so that the user operation can be easier, and it can be ensured that the target icon is displayed in the page specified by the user.

Optionally, after step 102, before step 103, the method further includes:

obtaining characteristic information of the target icon, where the characteristic information of the target icon includes at least one of an application type of the target icon and a usage frequency of an application program corresponding to the target icon; and determining that a page that matches the characteristic information of the target icon on the terminal device is the second page.

In this implementation, after the second preset input performed on the target icon in the first page is received, the characteristic information of the target icon may be obtained first, so that the second page matching the characteristic information of the target icon may be determined based on the characteristic information of the target icon.

The characteristic information of the target icon may include at least one of the application type of the target icon and the usage frequency of the application program corresponding to the target icon. The application type of the target icon may be determined according to a classification label of the target icon in the first page, or may be determined according to an attribute nature of the application program corresponding to the target icon. The usage frequency of the application program corresponding to the target icon may be determined by the terminal device according to a quantity of times the application program corresponding to the target icon is started in a fixed statistical period (such as the latest day, the latest week, or the latest month).

For example, if it is learned that an application type of an application icon is game, a page where more game application icons are stored on the desktop may be determined as a target display page of the application icon. If it is learned that a usage frequency of an application program in an application folder icon is low, it may be determined that the last page on the desktop is a target storage page of the application folder icon, or the like.

In this way, in this implementation, the characteristic information of the target icon is obtained, so that the second page on the terminal device that matches the characteristic information of the target icon is determined. Therefore, the user does not need to perform the operation of selecting the second page, the terminal device can be more intelligent and human, user operations can be reduced, and icon management efficiency can be improved.

Optionally, after step 102, before step 103, the method further includes:

obtaining characteristic information of the target icon, where the characteristic information of the target icon includes at least one of an application type of the target icon and a usage frequency of an application program corresponding to the target icon; and determining that a page that matches the characteristic information of the target icon on the terminal device is the second page.

In this implementation, after the second preset input performed on the target icon in the first page is received, the characteristic information of the target icon may be obtained first, so that the second page matching the characteristic information of the target icon may be determined based on the characteristic information of the target icon.

The characteristic information of the target icon may include at least one of the application type of the target icon and the usage frequency of the application program corresponding to the target icon. The application type of the target icon may be determined according to a classification label of the target icon in the first page, or may be determined according to an attribute nature of the application program corresponding to the target icon. The usage frequency of the application program corresponding to the target icon may be determined by the terminal device according to a quantity of times the application program corresponding to the target icon is started in a fixed statistical period (such as the latest day, the latest week, or the latest month).

For example, if it is learned that an application type of an application icon is game, a page where more game application icons are stored on the desktop may be determined as a target display page of the application icon. If it is learned that a usage frequency of an application program in an application folder icon is low, it may be determined that the last page on the desktop is a target storage page of the application folder icon, or the like.

In this way, in this implementation, the characteristic information of the target icon is obtained, so that the second page on the terminal device that matches the characteristic information of the target icon is determined. Therefore, the user does not need to perform the operation of selecting the second page, the terminal device can be more intelligent and human, user operations can be reduced, and icon management efficiency can be improved.

Step 103: Display the target icon in a second page in response to the second preset input, where the second page is different from the first page.

After the user performs the second preset input on the target icon, the terminal device may display the target icon in the second page in response to the second preset input. Optionally, the target icon may be moved from the first page to the second page, or the target icon in the first page is copied to the second page, or an icon in the second page is replaced with the target icon in the first page, to complete the management of moving, copying, or replacing the target icon.

The second page and the first page are different pages, for example, the second page may be any existing page or a newly created page on the desktop of the terminal device except the first page.

In this embodiment, the second page may be determined in many different ways. For example, the terminal device may automatically determine a desirable display page on the desktop according to relevant information of the target icon (such as a type, a function attribute, a usage frequency, and a usage duration), or the user may specify the target display page after target icon management in advance.

In the embodiments of the present disclosure, the terminal device can be any device with a storage medium, for example, a terminal device such as a computer (Computer), a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device).

In the icon management method in this embodiment, a first page is activated in a case that a first preset input is received; a second preset input performed on a target icon in the first page is received; and the target icon is displayed in a second page in response to the second preset input, where the second page is different from the first page. In this way, the user can activate the first page through the first preset input, and can perform the second preset input on the target icon to be managed in the first page, so that the target icon can be displayed in the second page, and the user does not need to drag the icon to perform cross-page operations, which has the advantages of simple operation and high efficiency.

Figure 2:
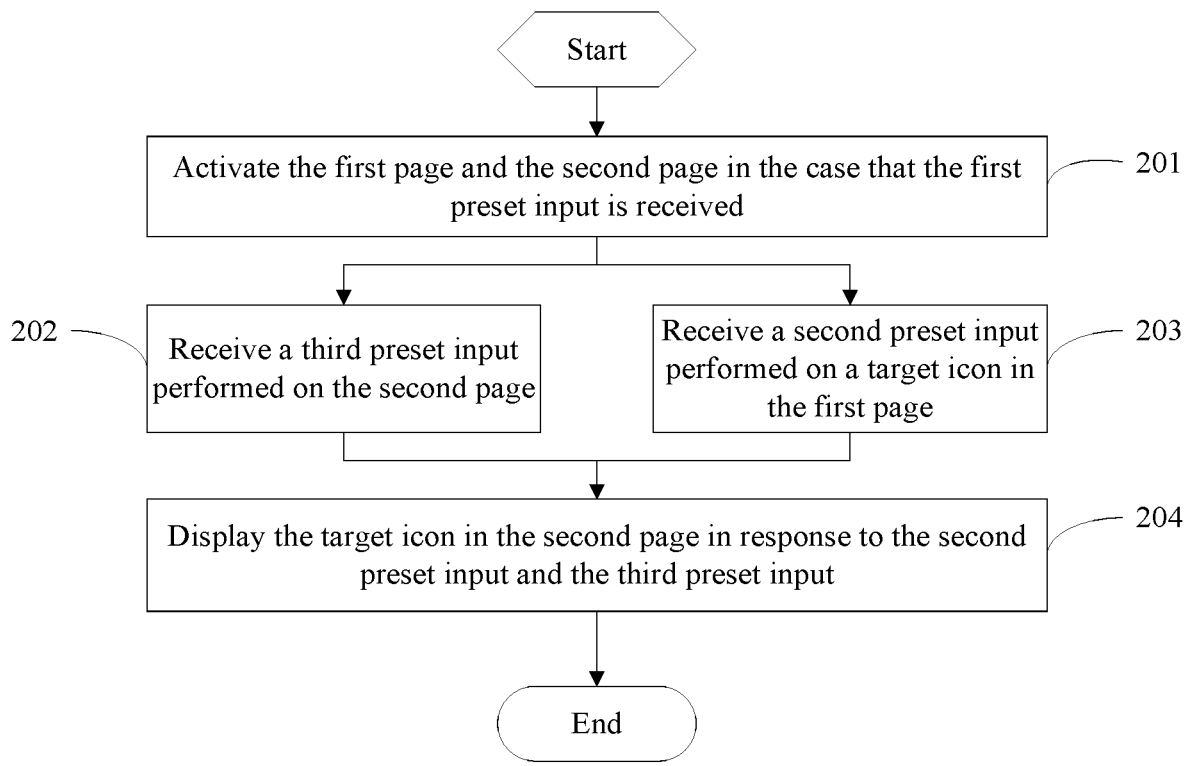
FIG. 2 is a flowchart of another icon management method according to the embodiments of the present disclosure.

Referring to FIG. 2, FIG. 2 is a flowchart of another icon management method according to the embodiments of the present disclosure. The method is applied to a terminal device. On the basis of the embodiment shown in FIG. 1, in this embodiment, a step of how to determine the second page is described, so that the method for determining the target page is clearer and more specific. As shown in FIG. 2, the method includes the following steps.

Step 201: Activate the first page and the second page in the case that the first preset input is received.

In this embodiment, when the first preset input is received, the second page may be further activated. The activating the second page may be activating the second page, so that the second page enters an editable state, and the user may select or set the second page as the target display page of an icon to be managed. Optionally, the activating the second page may include: displaying a specific control in the second page such as a selection control, so that the user may select the second page as the target display page of the target icon in the first page by touching the selection control.

For some implementations of the first preset input and activation of the first page, refer to related implementations of step 101 in the method embodiment shown in FIG. 1. To avoid repetition, this is not repeated herein.

Step 202: Receive a third preset input performed on the second page.

The third preset input may be a preset input used to set the second page as the target display page of the target icon. Optionally, the second preset input may be a specific input performed on the second page, or a touch input performed on a specific control (such as a selection control) in the second page.

Optionally, step 201 includes:
displaying a second target control in each of the first page and the second page in the case that the first preset input is received.

Step 202 includes:
receiving the third preset input performed on the second target control in the second page.

In this implementation, the activating the first page and the second page may be: displaying the second target control in each of the first page and the second page of the terminal device. It should be noted that in the case that the first preset input is received, in addition to the first page and the second page, other pages may be further activated, for example, all pages on the desktop of the terminal device, that is, the second target control may be displayed in each page of the desktop.

The second target control may be a control used to select, set, or mark a corresponding page as the target display page, and may be displayed in a preset position in each page. To maintain a beautiful interface and facilitate user operation, the first target control is displayed in the lower left corner or lower right corner of the page.

In this way, the user may select the page as the target display page of the icon during subsequent icon management through the second target control in each page. In this way, the user may clearly observe icon display information in each page in the process of selecting the target display page, so that the user can more accurately select the target display page according to requirements.

For example, the second target control in a selected state and the second target control in an unselected state may be displayed in a preset position (such as the lower right corner) of each page on the desktop. An initial state of the second target control in each page may be unselected state by default. In this way, the user may slide leftwards or rightwards on the desktop of the terminal device to switch to a page where the icon to be managed is to be stored, and complete a selection operation of the second page by setting the second target control in the page to the selected state.

It should be noted that the activating the first page and the second page may not only include: displaying the second target control in each of the first page and the second page, but also may include displaying the first target control on each icon in the first page and the second page, so that the user can quickly complete the page selection operation and the icon management operation through the first target control and the second target control. In addition, the first target control and the second target control may be displayed synchronously, or displayed sequentially, and the sequence is not limited.

In this implementation, the user may complete the page selection operation by executing the third preset input on the second target control in the second page. After the terminal device receives the third preset input, the second page may be determined as the target display page for subsequent icon management. When the user performs the second preset input on the first target control on an icon in the first page, the icon is displayed in the second page.

The third preset input may be a touch input such as click, double-click, long press, or press. The user may perform the third preset input on the second target control in a page, so that the page corresponding to the second target control may be selected as the target display page for subsequent icon management.

In this way, the second target control is displayed in each second page, so that the user can quickly and intuitively complete the page selection operation.

Optionally, step 201 includes:
in the case that the first preset input is received, displaying thumbnails of the first page and the second page in a preset area of the screen of the terminal device, and displaying a third target control in each of the thumbnail of the first page and the thumbnail of the second page.

Step 202 includes:
receiving the third preset input performed on the third target control in the thumbnail of the second page.

In this implementation, to facilitate the user to select the target display page of the icon to be managed, and reduce a quantity of page switching operations that the user needs to perform when selecting the target display page, in the case that the first preset input is received, thumbnails of the first page and the second page may be displayed in a preset area of the screen of the terminal device, and a third target control may be displayed in each of the thumbnail of the first page and the thumbnail of the second page.

The third target control may be a control used to select, set, or mark the corresponding thumbnail page as the target display page, and may be displayed in a preset position of each thumbnail page, for example, the upper left corner, upper right corner, lower left corner, or the lower right corner of the page. The third target control may be the same control as the second target control or a different control, but both can be used to perform the page selection function.

The preset area may be a screen area preset by the terminal device to display the page thumbnail. For example, the preset area may be an area in the lower half of the screen of the terminal device. When the first preset input is received, the upper half of the screen of the terminal device displays the original page on the desktop, the lower half of the screen of the terminal device displays the thumbnail of each page, and the third target control is displayed in the thumbnail of each page. Alternatively, the preset area may be the entire area of the screen of the terminal device. When a preset touch operation performed on an icon on the desktop is received, the thumbnail of each page may be directly displayed in each area on the screen of the terminal device in a tiling manner, and the third target control is displayed in the thumbnail of each page.

In this way, the user may directly select a page in the preset area as the target display page of the icon to be managed. For example, the third preset input is performed on the third target control in the thumbnail of the second page, to select the second page as the target display page.

After the terminal device receives the third preset input performed on the third target control in the thumbnail of the second page, the second page may be determined as the target display page. When the user performs the second preset input on the first target control on an icon in the first page, the icon is displayed in the second page.

In this way, in this implementation, the thumbnail of each page is displayed in the preset area of the screen of the terminal device, and the third target control is displayed in the thumbnail of each page, so that the user can directly complete the page selection operation on the current interface without switching between pages, which can further improve icon management efficiency.

Step 203: Receive a second preset input performed on a target icon in the first page.

For a implementation of this step, refer to an implementation of step 102 in the method embodiment shown in FIG. 1. To avoid repetition, details are not described herein.

It should be noted that in this embodiment, it is not limited that step 203 is performed after step 202, and step 203 may also be performed before step 202, that is, the user may first select the icon to be managed, and then select the page for displaying the icon.

Step 204: Display the target icon in the second page in response to the second preset input and the third preset input.

Through the second preset input and the third preset input, the target icon that the user wants to manage and the second page where the user wants to display the target icon may be determined, so that the target icon is displayed in the second page in response to the second preset input and the third preset input. Optionally, the target icon may be moved from the first page to the second page, or the target icon of the first page is copied to the second page, or an icon in the second page is replaced with the target icon in the first page, to complete the management of moving, copying, or replacing the target icon.

It should be noted that when the user performs the second preset input on the first target control on the icon in the second page, since the icon is already in the second page and there is no cross-page movement, copying, or replacement, the terminal device determines that the current operation is invalid, that is, does not respond to the second preset input.

Optionally, before Step 204, the method further includes: determining whether the second page has a vacant icon display position.

Step 204 includes:

when determining that the second page has a vacant icon display position, displaying the target icon in the second page in response to the second preset input and the third preset input.

In this implementation, after receiving the second preset input performed on the target icon in the first page, it may be first determined whether the second page further has a vacant icon display position. This may be: obtaining icon display status information of the second page, and determining whether the second page further has a remaining vacant icon position, to determine whether the target icon may be displayed in the second page. In the case that the second page has a vacant icon display position, the target icon may be displayed in the second page in response to the second preset input.

Optionally, after the determining whether the second page has a vacant icon display position, the method further includes:

in a case of determining that the second page does not have a vacant icon display position, creating a new blank page after the target page in response to the second preset input; and displaying the target icon in the newly created blank page.

In another case, if it is determined that the second page has no vacant icon display position, a new blank page after the second page is created in response to the second preset input, and the target icon is displayed in the newly created blank page, to complete page position management of the target icon.

For example, after page B on the desktop is selected as the target display page, a remaining vacant icon position in page B may be first obtained. If it is determined that page B has a vacant icon position, the icon corresponding to the movement control touched by the user in page A may be moved to page B. When page B is full of icons and it is detected that the user continues to touch the movement control of another icon in page A, a new page C may be created after page B and the another icon may be moved to page C.

In this way, after determining the second page, before managing the target icon, it is determined whether the second page has a vacant icon display position, to determine a final display page of the target icon to avoid icon management failure caused by insufficient icon display position of the second page.

It should be noted that this embodiment may also be applied to a terminal device with dual screens. In addition, when the icon management method in this embodiment is used, the icon management method may be operated in combination with dual screens of the terminal device, allowing users to operate with more simplicity, flexibility, and fun. For example, the page of the icon to be managed may be displayed on one screen of the terminal device, and the target display page of the icon may be displayed on the other screen. In this way, in the icon management process, the user can visually observe an icon position change after icon management, and easily change the target display page and a page of other icons to be managed.

For another example, for the terminal device with a front screen and a back screen, the user may perform an icon management operation on any screen of the terminal device, and may switch to the other screen to continue the original icon management operation by flipping the screen. That is, after the user flips the screen, the icon management interface displayed on the original front screen can be transferred to the flipped front screen, so that the user can continue to perform the icon management operation.

In this embodiment, when the first preset input is received, the first page and the second page are activated, the third preset input performed on the second page is received, and the second preset input performed on the target icon for the first page is received, to display the target icon of the first page in the second page. Therefore, users can freely select the icon to be managed and the page where the user wants to display the icon, and can quickly and easily complete icon management, which has the advantages of operation simplicity and efficiency.

In addition, this embodiment adds various optional implementations on the basis of the embodiment shown in FIG. 1. These optional implementations can be realized in combination with each other or separately, and can achieve the technical effect of simple operation and high efficiency.

In the following example, with reference to FIG. 3a to FIG. 3e, the desktop of the terminal device includes page A and page B, and an icon is moved, to describe the implementations in the embodiments of the present disclosure.

Figure 3A:
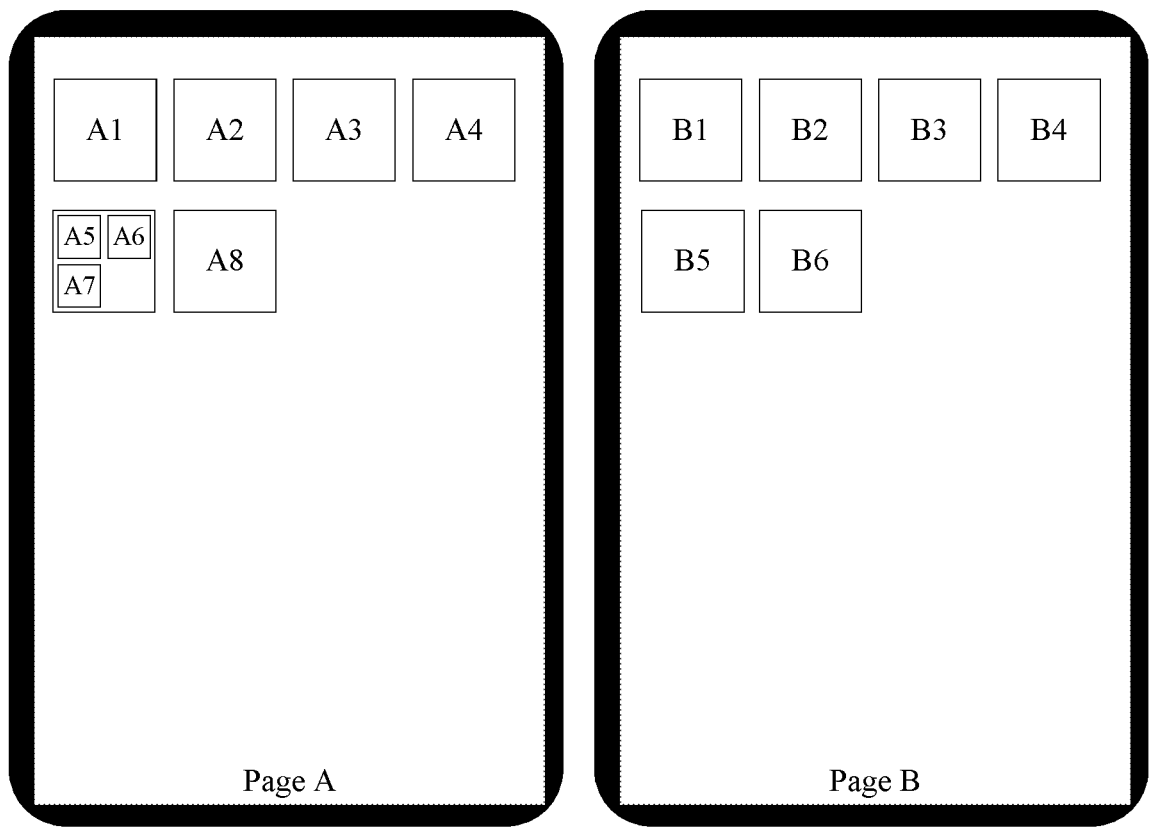
FIG. 3a is a schematic diagram of an interface of page A and page B according to the embodiments of the present disclosure.

As shown in FIG. 3a, page A and page B on the desktop of the terminal device display different application icons and/or application folder icons. The figure only shows icon information of page A and page B on the desktop, and does not limit that the desktop of the terminal device displays page A and page B at the same time, and the user can switch between pages of the desktop on the screen.

Figure 3B:
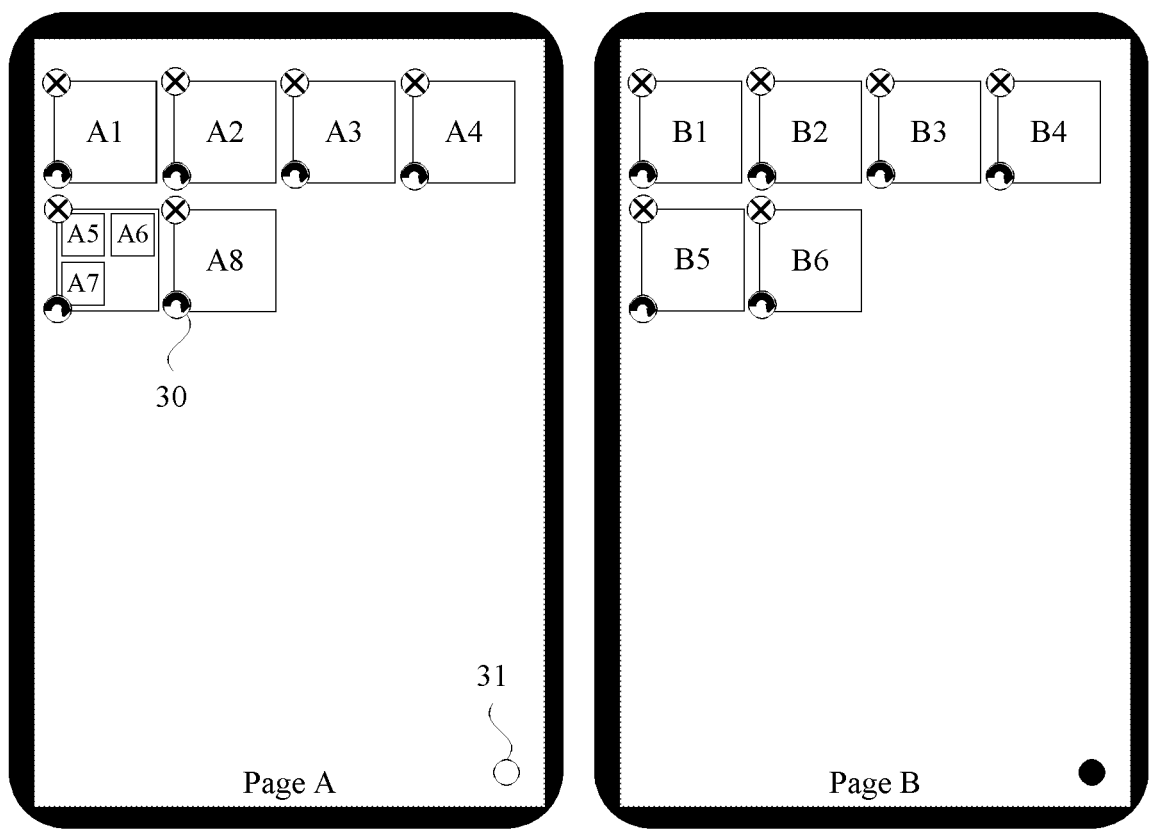
FIG. 3b is a schematic diagram of an interface after page A and page B enter an icon movement interface mode according to the embodiments of the present disclosure.

When a long-press operation performed by the user on any icon of the desktop is received, as shown in FIG. 3b, both page A and page B on the desktop of the terminal device enter an icon movement interface mode, a corresponding movement corner mark 30 is displayed in the lower left corner of each icon in page A and page B, and a circle-shaped movement control 31 is displayed in lower right corners of both page A and page B. When the movement control 31 is white, it means that the corresponding page is in an unselected state, and when the movement control 31 is black, it means that the corresponding page is in a selected state.

After the user clicks on the movement control in page B, as shown in FIG. 3b, the movement control in page B is displayed in black, which indicates that page B is selected as the target display page for subsequent icon movement. Subsequently, the user can touch the movement corner mark on each icon in page A to move the icon in page A to page B.

Figure 3C:
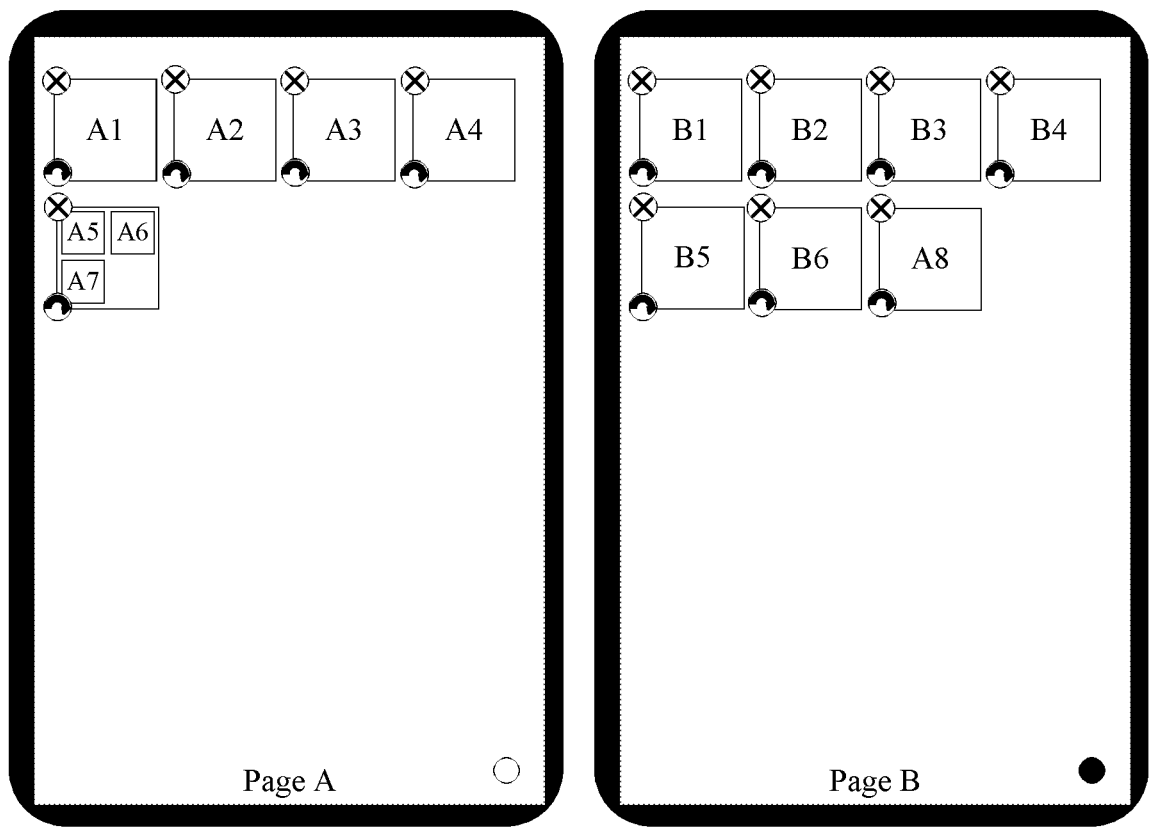
FIG. 3c is a schematic diagram of an interface after an application icon in page A is moved to page B according to the embodiments of the present disclosure.

For example, when the user clicks on the movement corner mark of the application icon A8 in page A, as shown in FIG. 3c, the application icon A8 is moved to page B.

Figure 3D:
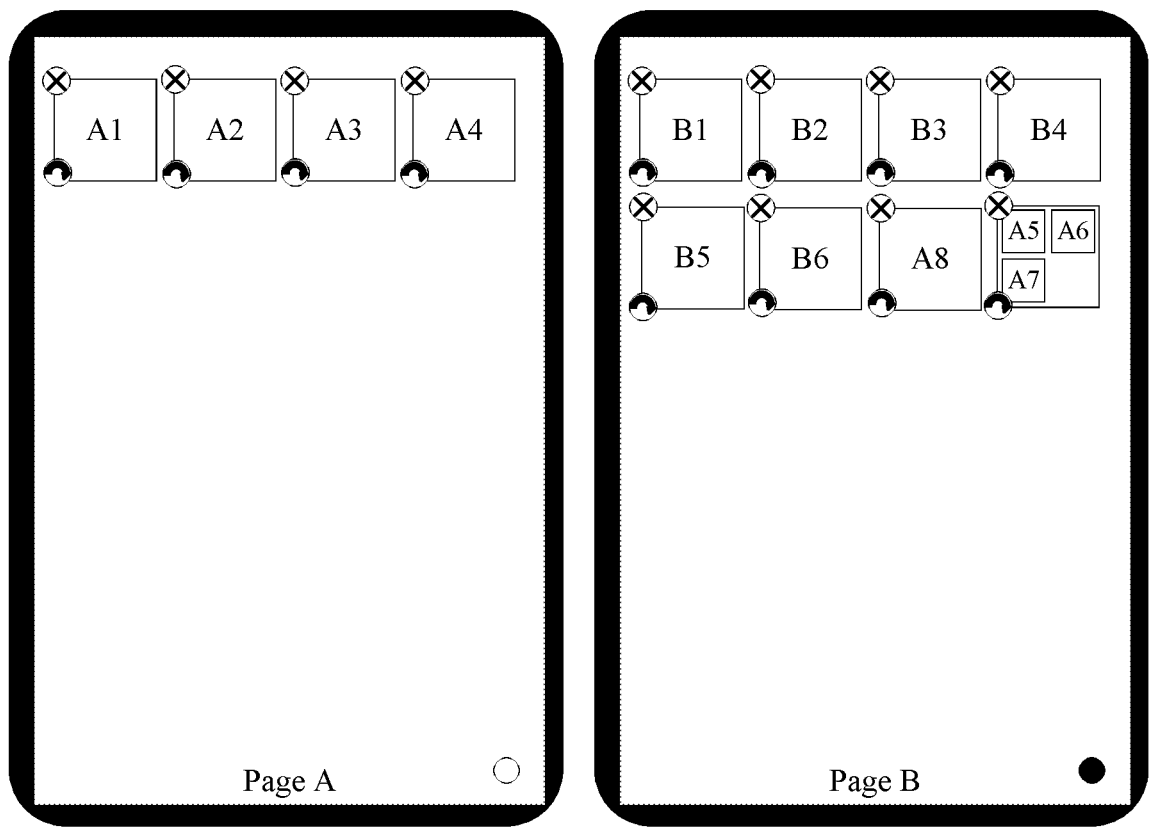
FIG. 3d is a schematic diagram of an interface after an application folder icon in page A is moved to page B according to the embodiments of the present disclosure.

In addition, the user can also move an application folder icon that includes application icons A5, A6, and A7 in page A to page B. For example, after the user clicks on the movement corner mark of the application folder icon in page A, as shown in FIG. 3d, the application folder icon is moved to page B.

It should be noted that if the user wants to move the icon in page B to page A, the user can click on the movement control in page A to set page A as the target display page for subsequent icon movement, and can click on the movement corner mark on the icon in page B to complete a similar icon movement operation.

Figure 3E:
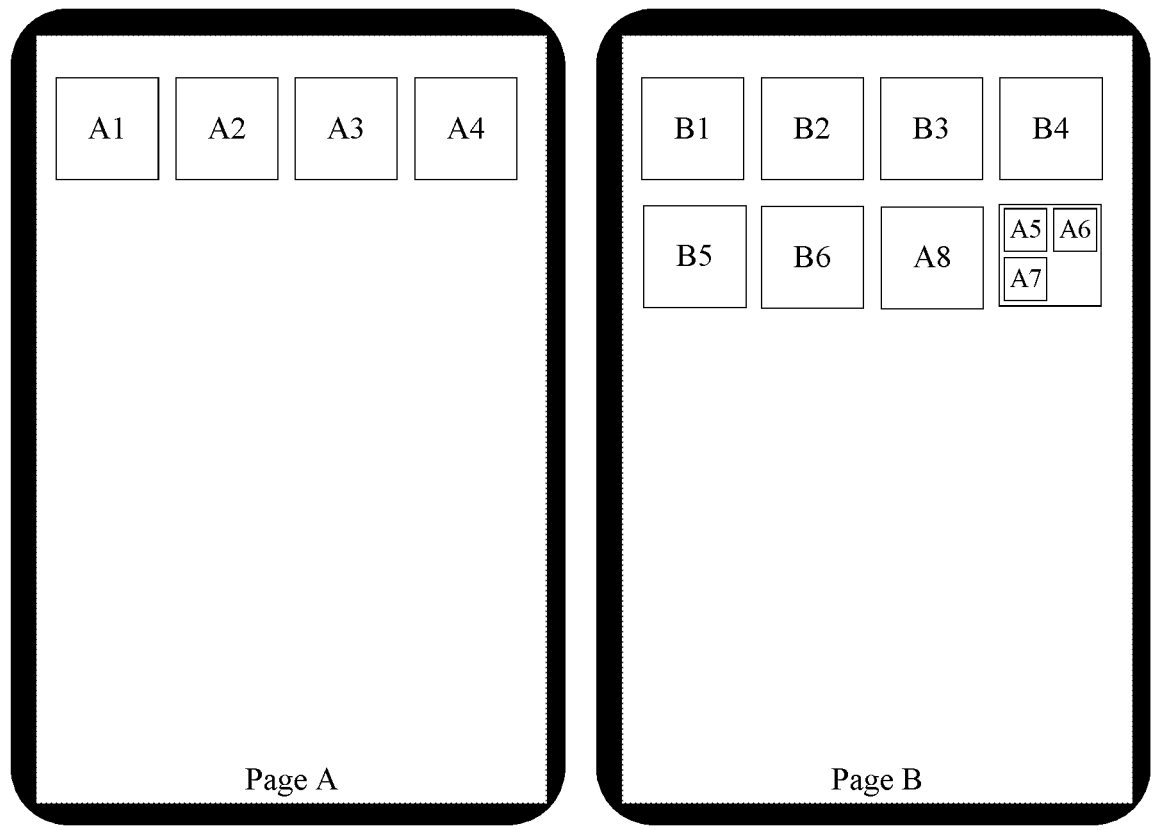
FIG. 3e is a schematic diagram of an interface after page A and page B exit from an icon movement interface mode according to the embodiments of the present disclosure.

As shown in FIG. 3e, after the user completes the icon movement operation, the icon movement interface mode can be exited. Optionally, page A and page B can be restored to the original display interface by touching the return key or Home key of the terminal device or the like.

Figure 4:
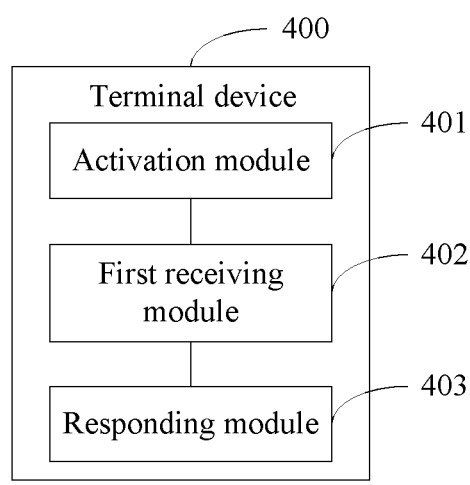
FIG. 4 is a schematic structural diagram of a terminal device according to the embodiments of the present disclosure.

Referring to FIG. 4, FIG. 4 is a schematic structural diagram of a terminal device according to an embodiment of this disclosure. As shown in FIG. 4, the terminal device 400 includes:

an activation module 401, configured to activate a first page in a case that a first preset input is received;

a first receiving module 402, configured to receive a second preset input performed on a target icon in the first page; and a responding module 403, configured to display the target icon in a second page in response to the second preset input, where the second page is different from the first page.

Optionally, the activation module 401 is configured to activate the first page and the second page in the case that the first preset input is received.

Figure 5:
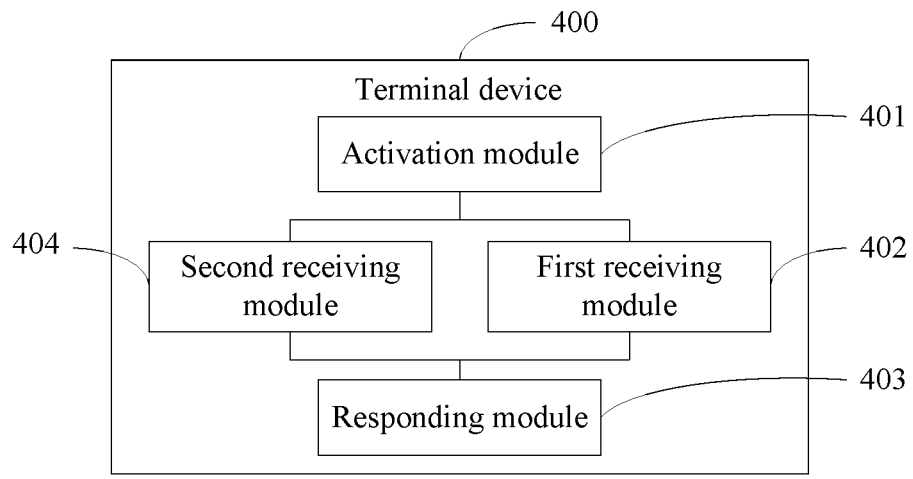
FIG. 5 is a schematic structural diagram of another terminal device according to the embodiments of the present disclosure.

As shown in FIG. 5, the terminal device 400 further includes:

a second receiving module 404, configured to receive a third preset input performed on the second page; and the responding module 403 is configured to display the target icon in the second page in response to the second preset input and the third preset input.

Optionally, the activation module 401 is configured to display a first target control on each icon in the first page; and the first receiving module 402 is configured to receive the second preset input performed on the first target control on the target icon in the first page.

Optionally, the activation module 401 is configured to display a second target control in each of the first page and the second page; and the second receiving module 404 is configured to receive a third preset input performed on the second target control in the second page.

Optionally, the activation module 401 is configured to display thumbnails of the first page and the second page in a preset area of the screen of the terminal device 400, and display a third target control in each of the thumbnail of the first page and the thumbnail of the second page; and the second receiving module 404 is configured to receive the third preset input performed on the third target control in the thumbnail of the second page.

Figure 6:
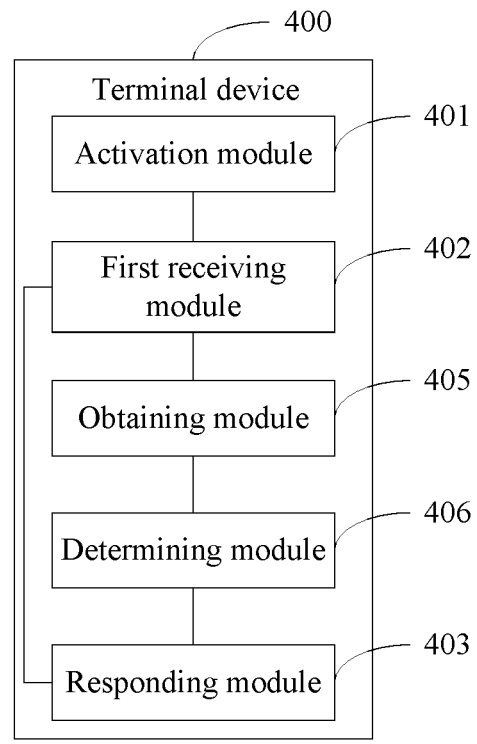
FIG. 6 is a schematic structural diagram of another terminal device according to the embodiments of the present disclosure.

Optionally, as shown in FIG. 6, the terminal device 400 further includes:

an obtaining module 405, configured to obtain characteristic information of the target icon, where the characteristic information of the target icon includes at least one of an application type of the target icon and a usage frequency of an application program corresponding to the target icon; and a determining module 406, configured to determine that a page that matches the characteristic information of the target icon on the terminal device 400 is the second page.

Optionally, the first target control on the target icon displays at least one recommended page option corresponding to the target icon; and the first receiving module 402 is configured to receive the second preset input performed on a target recommended page option, where the target recommended page option is one of the at least one recommended page option, and a page indicated by the target recommended page option is the second page.

The terminal device 400 can implement the processes implemented by the terminal device in the method embodiments in FIG. 1 and FIG. 2. To avoid repetition, details are not described herein again. The terminal device 400 in the embodiments of the present disclosure may activate a first page in a case that a first preset input is received; receive a second preset input performed on a target icon in the first page; and display the target icon in a second page in response to the second preset input, where the second page is different from the first page. In this way, the user can activate the first page through the first preset input, and can perform the second preset input on the target icon to be managed in the first page, so that the target icon can be displayed in the second page, and the user does not need to drag the icon to perform cross-page operations, which has the advantages of simple operation and high efficiency.

Figure 7:
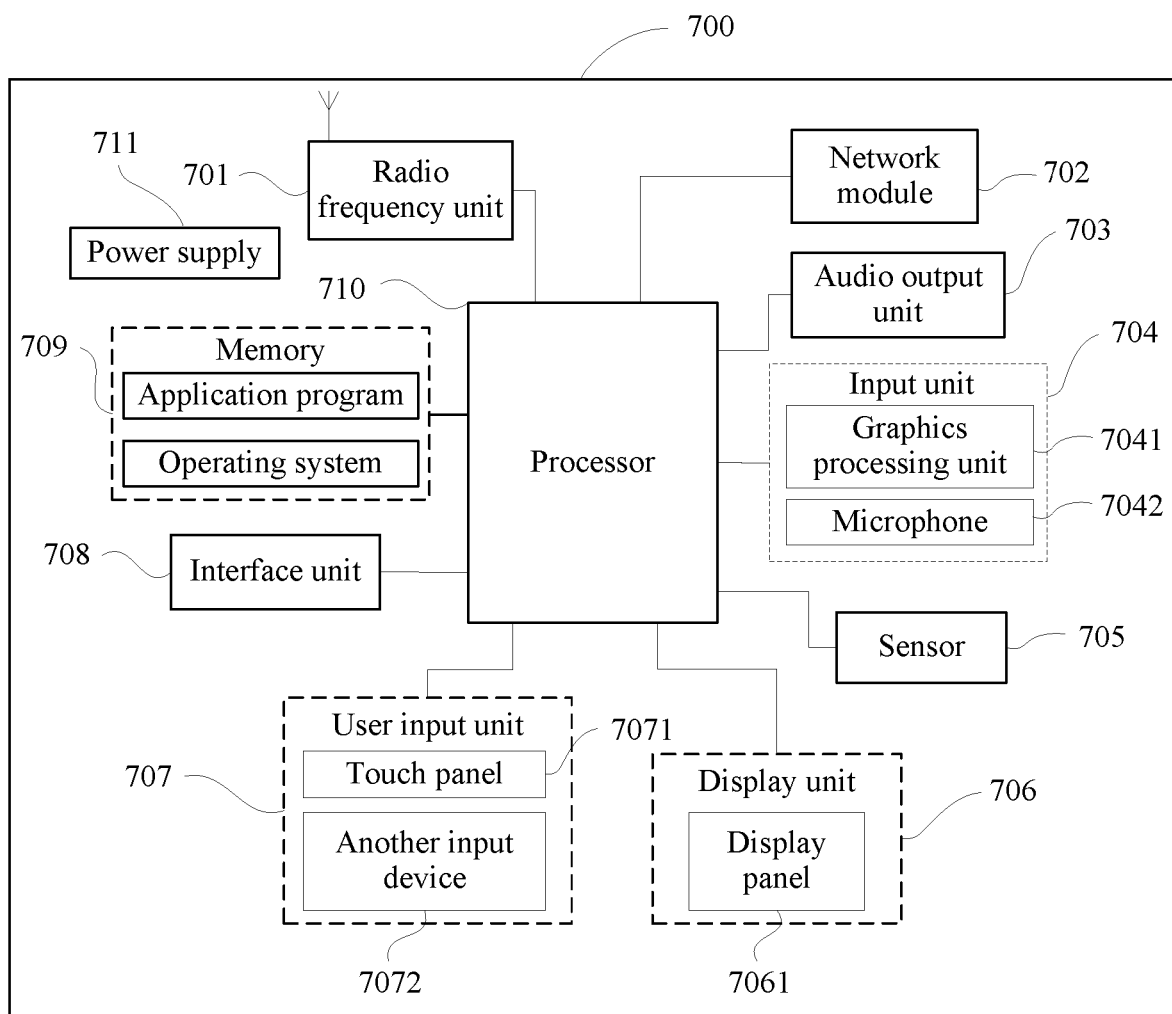
FIG. 7 is a schematic structural diagram of hardware of a terminal device according to the embodiments of the present disclosure.

FIG. 7 is a schematic structural diagram of hardware of a terminal device implementing the various embodiments of the present disclosure. The terminal device 700 includes, but not limited to: a radio frequency unit 701, a network module 702, an audio output unit 703, an input unit 704, a sensor 705, a display unit 706, a user input unit 707, an interface unit 708, a memory 709, a processor 710, a power supply 711, and the like. A person skilled in the art may understand that the structure of the terminal device shown in FIG. 7 does not constitute a limitation to the terminal device. The terminal device may include more or fewer components than that shown in the figure, or a combination of some components, or an arrangement of different components. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 710 is configured to execute the following steps:

activating a first page in a case that a first preset input is received;

receiving a second preset input performed on a target icon in the first page; and displaying the target icon in a second page in response to the second preset input, where the second page is different from the first page.

Optionally, the processor 710 is further configured to:

activate the first page and the second page in the case that the first preset input is received;

receive a third preset input performed on the second page; and display the target icon in the second page in response to the second preset input and the third preset input.

Optionally, the processor 710 is further configured to:

display a first target control on each icon in the first page; and receive the second preset input performed on the first target control on the target icon in the first page.

Optionally, the processor 710 is further configured to:

display a second target control in each of the first page and the second page; and receive a third preset input performed on the second target control in the second page.

Optionally, the processor 710 is further configured to:

display thumbnails of the first page and the second page in a preset area of the screen of the terminal device 700, and display a third target control in each of the thumbnail of the first page and the thumbnail of the second page; and receive the third preset input performed on the third target control in the thumbnail of the second page.

Optionally, the processor 710 is further configured to:

obtain characteristic information of the target icon, where the characteristic information of the target icon includes at least one of an application type of the target icon and a usage frequency of an application program corresponding to the target icon; and determining that a page that matches the characteristic information of the target icon on the terminal device 700 is the second page.

Optionally, the first target control on the target icon displays at least one recommended page option corresponding to the target icon; and the processor 710 is further configured to:

receive the second preset input performed on a target recommended page option, where the target recommended page option is one of the at least one recommended page option, and a page indicated by the target recommended page option is the second page.

The terminal device 700 can implement each process implemented by the terminal device in the foregoing embodiments. To avoid repetition, details are not described herein again. The terminal device 700 in the embodiments of the present disclosure may activate a first page in a case that a first preset input is received; receive a second preset input performed on a target icon in the first page; and display the target icon in a second page in response to the second preset input, where the second page is different from the first page. In this way, the user can activate the first page through the first preset input, and can perform the second preset input on the target icon to be managed in the first page, so that the target icon can be displayed in the second page, and the user does not need to drag the icon to perform cross-page operations, which has the advantages of simple operation and high efficiency.

It should be understood that in the embodiments of the present disclosure, the radio frequency unit 701 can be configured to receive and send information or receive and send signal during calls. For example, the radio frequency unit 701 receives downlink data from a base station, and transmits the downlink data to the processor 710 for processing. In addition, the radio frequency unit 701 sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with another device by using a wireless communications system and network.

The terminal device provides a user with wireless broadband Internet access through the network module 702, for example, helps the user send and receive emails, browse web pages, and access streaming media.

The audio output unit 703 may convert audio data received by the radio frequency unit 701 or the network module 702 or stored in the memory 709 into an audio signal, and output the audio signal as sound. In addition, the audio output unit 703 may further provide audio output (for example, a call signal received voice, or a message received voice) related to a specific function executed by the terminal device 700. The audio output unit 703 includes a loudspeaker, a buzzer, a receiver, and the like.

The input unit 704 is configured to receive audio or video signals. The input unit 704 may include a graphics processing unit (Graphics Processing Unit, GPU) 7041 and a microphone 7042. The graphics processing unit 7041 processes image data of a static picture or a video obtained by an image capture apparatus (for example, a camera) in video capture mode or image capture mode. A processed image frame may be displayed on the display unit 706. The image frame processed by the graphics processing unit 7041 can be stored in the memory 709 (or another storage medium) or sent via the radio frequency unit 701 or the network module 702. The microphone 7042 may receive a sound and can process such sound into audio data. The processed audio data may be converted, in a call mode, into a format that can be sent by the radio frequency unit 701 to a mobile communication base station for output.

The terminal device 700 further includes at least one sensor 705, such as a light sensor, a motion sensor and other sensors. The light sensor includes an ambient light sensor and a proximity sensor. The ambient light sensor may adjust luminance of a display panel 7061 based on brightness of ambient light. The proximity sensor may turn off the display panel 7061 and/or backlight when the terminal device 700 approaches an ear. As a type of the motion sensor, an accelerometer sensor may detect an acceleration in each direction (generally, three axes), and detect a value and a direction of gravity when the accelerometer sensor is static, and may be configured to identify a posture of the terminal device (such as screen switching between landscape and portrait modes, a related game, or magnetometer posture calibration), a function related to vibration identification (such as a pedometer or a knock), and the like. The sensor 705 may further include a fingerprint sensor, a pressure sensor, an iris sensor, a molecular sensor, a gyroscope, a barometer, a hygrometer, a thermometer, and an infrared sensor. Details are not described herein.

The display unit 706 is configured to display information input by a user or information provided to a user. The display unit 706 may include a display panel 7061, and the display panel 7061 may be configured in a form of liquid crystal display (Liquid Crystal Display, LCD), organic light-emitting diode (Organic Light-Emitting Diode, OLED), or the like.

The user input unit 707 may be configured to receive input figures or character information and generate a key signal input related to user setting and function control of the terminal device. The user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be implemented by using a plurality of types such as a resistive type, a capacitive type, an infrared ray, and a surface acoustic wave. In addition to the touch panel 7071, the user input unit 707 may further include another input device 7072. The another input device 7072 may include but is not limited to a physical keyboard, a function key (such as a volume control key or an on/off key), a trackball, a mouse, a joystick, and the like. Details are not described herein again.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are configured as two independent components to implement input and output functions of the terminal device, but in some embodiments, the touch panel 7071 and the display panel 7061 may be integrated to implement the input and output functions of the terminal device. Details are not limited herein.

The interface unit 708 is an interface for connecting an external apparatus to the terminal device 700. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 708 may be configured to receive an input (for example, data information or power) from an external apparatus and transmit the received input to one or more elements in the terminal device 700, or transmit data between the terminal device 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, further include a non-volatile memory, for example, at least one disk storage device, a flash memory or other non-volatile solid storage devices.

The processor 710 is a control center of the terminal device, and various parts of whole terminal device are connected through various interfaces and circuits. Various functions and processing data of the terminal device are executed by running or executing a software program and/or a module stored in the memory 709 and calling data stored in the memory 709 so as to perform overall monitoring on the terminal device. The processor 710 may include one or more processing units. Optionally, an application processor and a modem processor may be integrated into the processor 710. The application processor mainly processes an operating system, a user interface, an application program, and the like. The modem processor mainly processes wireless communications. It may be understood that, alternatively, the modem processor may not be integrated into the processor 710.

The terminal device 700 may further include the power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal device 700 includes some functional modules that are not shown. Details are not described herein.

Optionally, an embodiment of the present disclosure further provides a terminal device, including a processor 710, a memory 709, and a computer program that is stored in the memory 709 and that can run on the processor 710. When the computer program is executed by the processor 710, each process of the embodiment of the foregoing icon management method can be implemented, and a same technical effect can be achieved. To avoid repetition, details are not described herein again.

An embodiment of the present disclosure further provides a non-transitory computer-readable storage medium. The non-transitory computer-readable storage medium stores a computer program, and when executing the computer program, a processor implements the foregoing processes of embodiments of the icon management method and a same technical effect can be achieved. To avoid repetition, details are not described herein again. The non-transitory computer-readable storage medium is, for example, a read-only memory (Read-Only Memory, ROM), a random access memory (Random Access Memory, RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An icon management method, applied to a terminal device and comprising:
   activating multiple desktop pages including a first page and a second page in response to a received first preset input performed on the first page, so that a respective second target control is displayed in each desktop page, wherein the second page is different from the first page;
   receiving a second preset input performed on a target icon in the first page;
   determining, according to the second preset input, the target icon as an icon that a user manages;
   receiving a third preset input performed on the second target control in the second page;
   determining, according to the third preset input, the second page as a target desktop page in which the target icon is to be displayed; and
   displaying the target icon in the second page in response to the second preset input and the third preset input,
   wherein each respective second target control is displayed in a lower right corner or a lower left corner of each desktop page, and
   wherein each respective second target control has a selected state or an unselected state, and when a second target control is in the selected state, the desktop page where the second target control is displayed is determined as the target desktop pane where the target icon is to be displayed.

2. The method according to claim 1, wherein the activating the first page comprises:
   displaying a first target control on each icon in the first page; and
   the receiving the second preset input performed on the target icon in the first page comprises:
   receiving the second preset input performed on the first target control on the target icon in the first page.

3. The method according to claim 2, wherein the first target control on the target icon displays at least one recommended page option corresponding to the target icon; and
   the receiving the second preset input performed on the first target control on the target icon in the first page comprises:
   receiving the second preset input performed on a target recommended page option, wherein the target recommended page option is one of the at least one recommended page option; wherein a page indicated by the target recommended page option is the second page.

4. The method according to claim 1, wherein the displaying the target icon in the second page comprises:
   moving the target icon from the first page to the second page;
   duplicating the target icon to the second page; or,
   replacing a first icon displayed in the second page with the target icon.

5. A terminal device, comprising a processor, a memory, and a computer program stored in the memory and executable on the processor, wherein the computer program, when executed by the processor, causes the terminal device to perform:
   activating multiple desktop pages including a first page and a second page in response to a received first preset input performed on the first page, so that a respective second target control is displayed in each desktop page, wherein the second page is different from the first page;
   receiving a second preset input performed on a target icon in the first page;
   determining, according to the second preset input, the target icon as an icon that a user manages;
   receiving a third preset input performed on the second target control in the second page;
   determining, according to the third preset input, the second page as a target desktop page in which the target icon is to be displayed; and
   displaying the target icon in the second page in response to the second preset input and the third preset input,
   wherein each respective second target control is displayed in a lower right corner or a lower left corner of each desktop page, and
   wherein each respective second target control has a selected state or an unselected state, and when a second target control is in the selected state, the desktop page where the second target control is displayed is determined as the target desktop page where the target icon is to be displayed.

6. The terminal device according to claim 5, wherein the computer program, when executed by the processor, causes the terminal device to perform:
   displaying a first target control on each icon in the first page; and
   receiving the second preset input performed on the first target control on the target icon in the first page.

7. The terminal device according to claim 6, wherein the first target control on the target icon displays at least one recommended page option corresponding to the target icon; and
   the computer program, when executed by the processor, causes the terminal device to perform:
   receiving the second preset input performed on a target recommended page option, wherein the target recommended page option is one of the at least one recommended page option; wherein a page indicated by the target recommended page option is the second page.

8. The terminal device according to claim 5, wherein the computer program, when executed by the processor, causes the terminal device to perform:
   moving the target icon from the first page to the second page;
   duplicating the target icon to the second page; or,
   replacing a first icon in the second page with the target icon.

9. A non-transitory computer-readable storage medium, wherein the non-transitory computer-readable storage medium stores a computer program, and the computer program, when executed by a processor of a terminal device, causes the terminal device to perform:
   activating multiple desktop pages including a first page and a second page in response to a received first preset input performed on the first page, so that a respective second target control is displayed in each desktop page, wherein the second page is different from the first page;
   receiving a second preset input performed on a target icon in the first page;
   determining, according to the second preset input, the target icon as an icon that a user manages;
   receiving a third preset input performed on the second target control in the second page;
   determining, according to the third preset input, the second page as a target desktop page in which the target icon is to be displayed; and
   displaying the target icon in the second page in response to the second preset input and the third preset input,
   wherein each respective second target control is displayed in a lower right corner or a lower left corner of each desktop page, and
   wherein each respective second target control has a selected state or an unselected state, and when a second target control is in the selected state, the desktop pane where the second target control is displayed is determined as the target desktop pane where the target icon is to be displayed.

10. The non-transitory computer-readable storage medium according to claim 9, wherein the computer program, when executed by the processor, causes the terminal device to perform:
    displaying a first target control on each icon in the first page; and
    receiving the second preset input performed on the first target control on the target icon in the first page.

11. The non-transitory computer-readable storage medium according to claim 9, wherein the computer program, when executed by the processor, causes the terminal device to perform:
    moving the target icon from the first page to the second page;
    duplicating the target icon to the second page; or,
    replacing a first icon in the second page with the target icon.

* * * * *